US006530984B2

(12) United States Patent
Stuart

(10) Patent No.: US 6,530,984 B2
(45) Date of Patent: Mar. 11, 2003

(54) AIR CLEANER RESONATOR MOUNTING SYSTEM AND COVER

(75) Inventor: Philip Edward Arthur Stuart, Chatham (CA)

(73) Assignee: Siemens VDO Automotive Inc., Tilbury (CA)

(*) Notice: Subject to any disclaimer, the term of this patent is extended or adjusted under 35 U.S.C. 154(b) by 3 days.

(21) Appl. No.: 09/847,241

(22) Filed: May 2, 2001

(65) Prior Publication Data

US 2001/0035096 A1 Nov. 1, 2001

Related U.S. Application Data

(60) Provisional application No. 60/205,733, filed on May 19, 2000.

(51) Int. Cl.[7] ................................................ B01D 51/00

(52) U.S. Cl. ..................... 96/380; 220/300; 123/184.57

(58) Field of Search ................................ 55/385.3, 480, 55/493, 380; 220/297, 298, 300, 301; 123/184.57; 96/380

(56) References Cited

U.S. PATENT DOCUMENTS 4,333,580 A * 6/1982 Sweigart, Jr. ............... 220/293
5,900,595 A 5/1999 Akima et al.
6,349,690 B2 * 2/2002 Utsumi et al. ......... 123/184.57

FOREIGN PATENT DOCUMENTS

| | | | | |
|---|---|---|---|---|
| DE | 3429633 | | 2/1986 | |
| DE | 4332559 | | 3/1995 | |
| EP | 0896148 | | 2/1999 | |
| JP | 02019644 A | * | 1/1990 | ............. 123/198 E |

OTHER PUBLICATIONS

Partial European Search Report for EP 01 20 1887 dated Jun. 27, 2002.

* cited by examiner

*Primary Examiner*—Robert A. Hopkins

(57) ABSTRACT

An air cleaner includes a slide retention structure which engages a sliding resonator volume. The volume slides along the slide retention structure into an assembled position. Once assembled, a tuning tube engages an aperture in the volume, the volume and the resonator assembly reducing noise produced by the engine. A flexible seal is positioned around the aperture to acoustically seal the resonator volume to the tuning tube. An air cleaner cover is secured to the box by a lock plate. To lock the cover to the box, the lock plate is slid so that a plurality of wedges on the plate are forced under hooks on the box, securing the cover to the box. A side opening located proximate to the wedges allow the lock plate to slide so that the hooks do not hinder the movement of the lock plate.

20 Claims, 4 Drawing Sheets

AIR CLEANER RESONATOR MOUNTING SYSTEM AND COVER

This application claims priority from provisional application Ser. No. 60/205,733 filed May 19, 2000.

BACKGROUND OF THE INVENTION

The present invention relates generally to an air cleaner resonator mounting system and cover.

An air cleaner purifies and directs air into an internal combustion engine. Noise is produced by the engine which travels back through the induction system. A resonator, such as a Helmholtz resonator, is commonly employed to reduce noise. As noise passes the tuning tube positioned in the resonator and an opposition noise wave is produced, the noise generated is reduced. The resonator and the tuning tube cooperate to resonate with and absorb acoustical noise at a predetermined frequency, thereby eliminating or diminishing these noises. In prior air cleaner assemblies, the resonator is commonly located outside the air cleaner box.

A cover is positioned over the air cleaner box to protect the interior contents of the box. Currently, metal or plastic fasteners such as spring clips, bolts or screws are employed to secure the cover to the air cleaner box. A hinge mechanism is often employed in connection with the fasteners.

There are several drawbacks to utilizing the air cleaner of the prior art. For one, as the resonator is located on the exterior of the air cleaner, additional space is occupied and exterior tubing is needed. An additional bracket or fastener is also needed to secure the resonator to the air cleaner. Additionally, the fasteners employed in the prior art to secure the cover to the box produce excess loads on the cover and the lower shell, which can result in leakage or over-design. Finally, the prior art fasteners are bulky, also occupying additional space.

Hence, there is a need in the art for an air cleaner resonator mounting system and cover.

SUMMARY OF THE INVENTION

The present invention relates generally to an air cleaner resonator mounting system and cover.

A slide retention structure is molded into an air cleaner box of an air cleaner. A recess molded into a resonator volume is engaged by the slide retention structure. The resonator volume slides along the slide retention structure and into an assembled position.

In the assembled position, a tuning tube is inserted into an aperture located on the lower surface of the volume. A flexible seal positioned around the aperture acoustically seals the resonator volume to the tuning tube.

In a second feature of the present invention, an air cleaner cover is secured to the air cleaner box by a lock plate. When the cover is placed on the box, a plurality of hooks on the box are positioned in a plurality of holes on the cover. The lock plate is then placed on the cover over the hooks and slid so that a plurality of wedges on the lock plate are forced under the hooks, securing the cover to the box. A side opening located proximate to the wedges allow the lock plate slide so that the hooks do not hinder the movement of the lock plate. Once locked, an end clip secures the lock plate.

Accordingly, the present invention provides an air cleaner resonator mounting system and cover.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
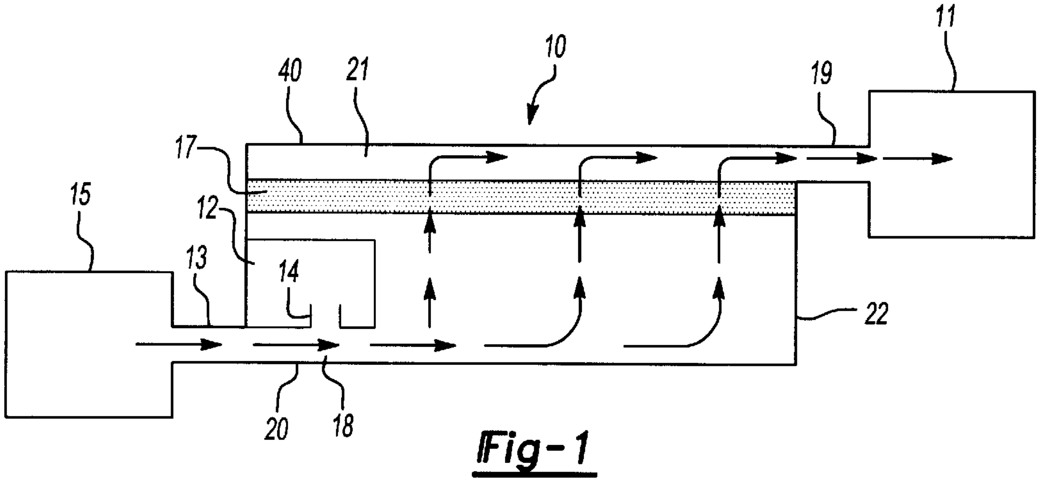
FIG. 1 illustrates an air cleaner in an engine air supply system.

FIG. 1 illustrates an air cleaner 10 for delivery of air to an internal combustion engine 11. Air enters an air cleaner box 22 through a duct 13 from a customer specified under hood location 15. Air passes through an air filter 17 which cleans the air and then enters an upper component 21 between the filter 17 and a cover 40, the cover 40 enclosing the box 22. The air exits the box 22 through another duct 19 and enters the engine 11.

Figure 2:
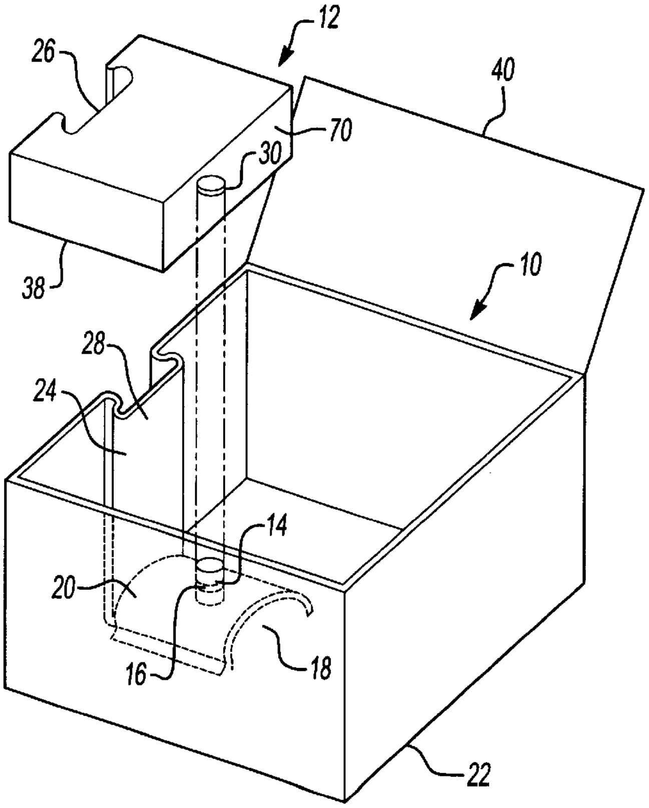
FIG. 2 illustrates an air cleaner box and an internal resonator volume.

FIG. 2 illustrates the air cleaner 10 of an air cleaner assembly. From the duct 13, air enters the box 22 through a hollow duct 18 which is formed inside the air cleaner 22. A tuning tube 14 having a plurality of holes/slots 16 is formed off of an inlet port 20. A resonator volume box 12 cooperates with a tuning tube 14 to absorb acoustical noise at a predetermined frequency, eliminating or diminishing noises produced as air travels through the air cleaner 10. The noise passing the tuning tube 14 resonates in the volume box 12 to create a tuned frequency. At this tuned frequency, sound waves of a predetermined frequency are reflected back into the air cleaner system and prevented from escaping to the exterior environment. In the preferred embodiment, the resonator volume box 12 is a Helmholtz resonator. After exiting the inlet port 20, the air enters the box 22 and moves to be filtered.

The resonator volume box 12 slides along a slide retention structure 24 in an air cleaner box 22. In the preferred embodiment, the slide retention structure 24, the inlet port 20, and the tuning tube 14 are molded into the box 22.

The resonator volume box 12 is either blow molded or injection molded. The lower surface 38 of the resonator volume box 12 includes an aperture 30 substantially sized and shaped to receive the tuning tube 14 when the resonator volume box 12 is assembled in the air cleaner 10. The volume box 12 further includes a recess 26 substantially sized and shaped to receive a protruded engagement portion 28 of the slide retainer structure 24. Alternatively, the resonator volume box 12 can include a protruded engagement portion and the slide retainer structure 24 can include a recess.

Figure 3:
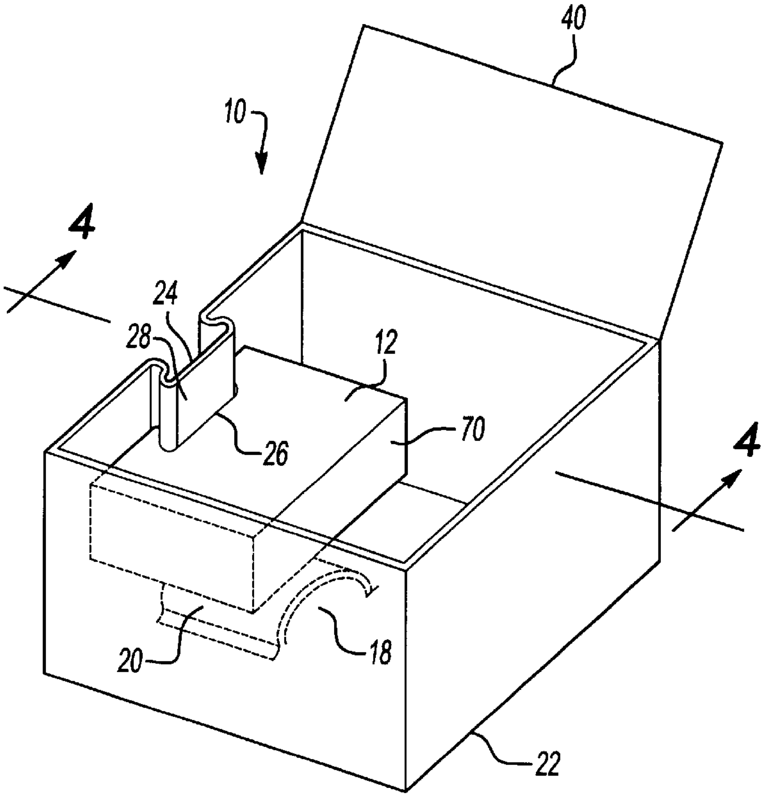
FIG. 3 illustrates an air cleaner box with the resonator volume installed.

As illustrated in FIG. 3, when the resonator volume box 12 is installed in the air cleaner box 22, the protruded engagement portion 28 of the slide retainer structure 24 substantially engages the recess 26 of the resonator volume box 12. As the resonator volume box 12 slides along the length of the slide retainer structure 24 towards the bottom of the air cleaner box 10, the tuning tube 14 inserts within the aperture 30. If the resonator volume box 12 is misinstalled, the volume box 12 will not engage the tuning tube 14 and will disengage from the air cleaner box 10 when the box 10 is flipped upside down.

Figure 4:
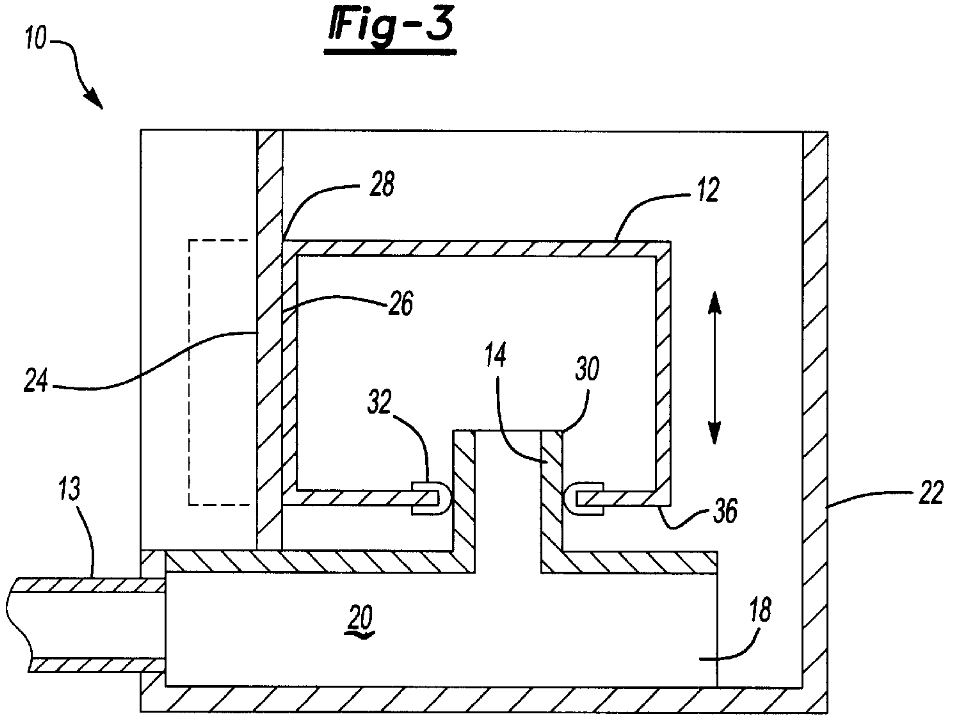
FIG. 4 illustrates a cross sectional side view of the air cleaner box and an installed resonator volume illustrating the fresh air connection and the seal.

As illustrated in FIG. 4, a flexible seal 32 positioned in the aperture 30 acoustically seals the resonator volume box 12 to the tuning tube 14. When the resonator volume box 12 is installed in the air cleaner box 22, the seal 32 surrounds the tuning tube 18 to acoustically seal the volume box 12.

As air passes through the air cleaner 10, it passes through the hollow duct 18 of the inlet port 20.

Figure 5:
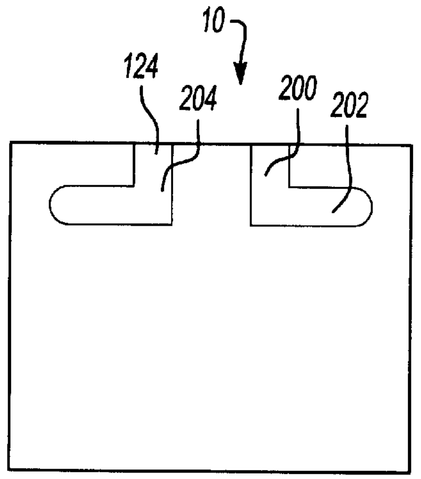
FIG. 5 illustrates a top view of an alternative embodiment of the slide retention structure of the air cleaner box.

In an alternative embodiment, as illustrated in FIG. 5, the slide retention structure 124 is formed by a pair of rails 200 attached to the air cleaner box 10. The rails 200 are positioned to substantially engage a corresponding recess 26 in the volume box 12 when the volume box 12 is assembled on the slide retention structure 124 and slid to engage the tuning tube 14. In the preferred embodiment, each of the pair of rails 200 include an attaching portion 204 and an angled portion 202. When the volume box 12 is assembled on the slide retention structure 124, the angled portion 202 secures the volume box 12 to the air cleaner box 10 and prevents the volume box 12 from disengaging.

Figure 6:
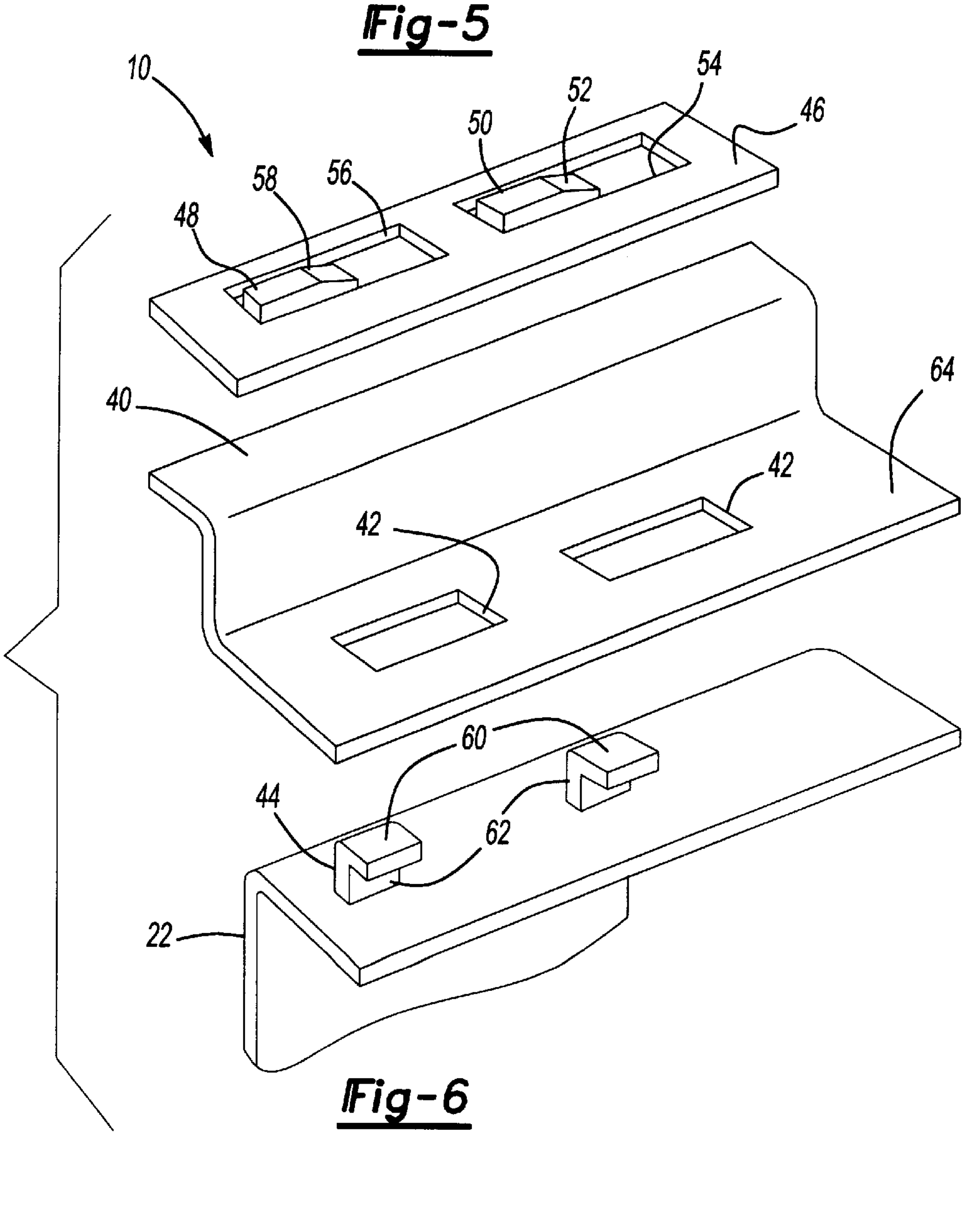
FIG. 6 illustrates an exploded view of the air cleaner cover of the present invention.

The air cleaner cover 40 includes a plurality of holes 42, as illustrated in FIG. 6.

The air cleaner box 22 further includes a plurality of hooks 44. When the cover 40 is positioned on the box 22, the holes 42 receive the plurality of hooks 44. Each hook 44 includes an attachment portion 62 and a substantially perpendicular upper portion 60. In an alternative embodiment, the hooks 44 are located on the cover 40 and the holes 42 are located on the box 22.

A lock plate 46 is employed to secure the cover 40 to the box 22. The lock plate 46 includes a plurality of inclined wedges 48 positioned to correspond to a hook 44 and a hole 42. The wedges 48 include a substantially flat upper portion 50 and an inclined portion 52 extending downwardly from the upper portion 50. An opening 54 is positioned proximate to each of the wedges 48 and includes a front portion 56 positioned in front of the inclined portion 52 and a side portion 58 positioned along the length of the wedge 48. The front portion 56 is sized and shaped to substantially receive the upper portion 60 of a hook 44, and the side portion 58 is sized and shaped to substantially receive the attachment portion 62 of the hook 44.

Figure 7:
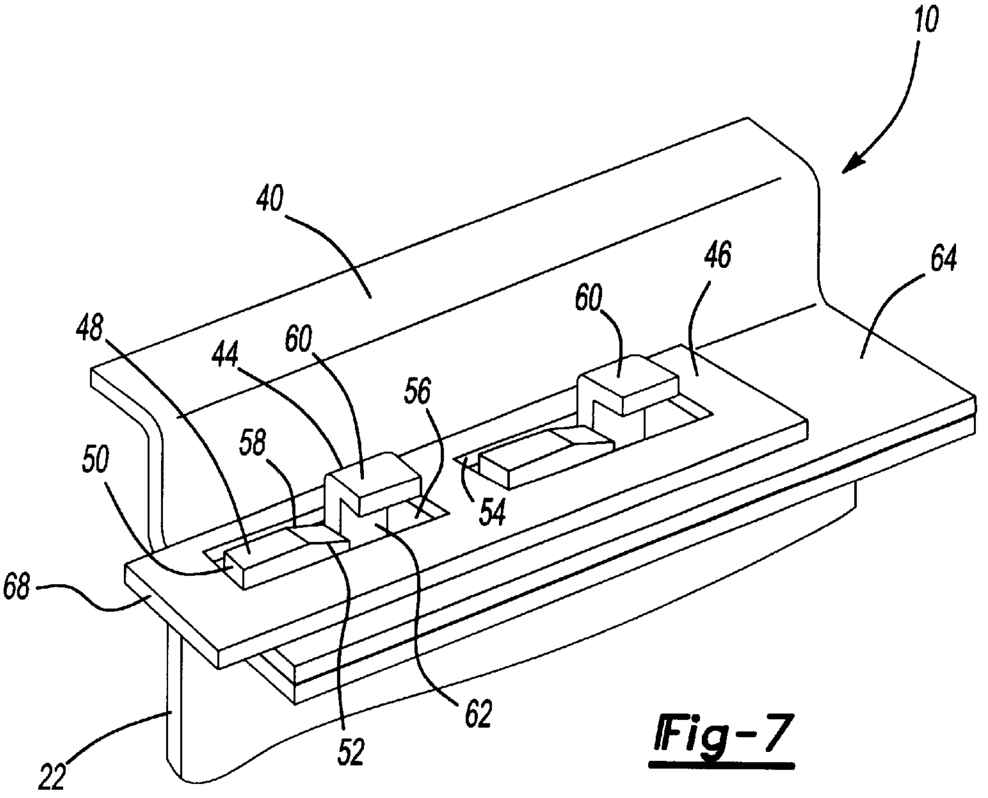
FIG. 7 illustrates the air cleaner cover in the open position.

When the cover 40 is positioned on the box 22, the hooks 44 are positioned within the holes 42. In the open position, as illustrated in FIG. 7, the lock plate 46 is positioned on the upper surface 64 of the cover 40 so that each of the hooks 44 are positioned in a front portion 56 of one of the openings 54 of the lock plate 46. Although two hooks 44 and holes 42 are illustrated, it is to be understood that any number of hooks 44 and holes 42 can be utilized.

Figure 8:
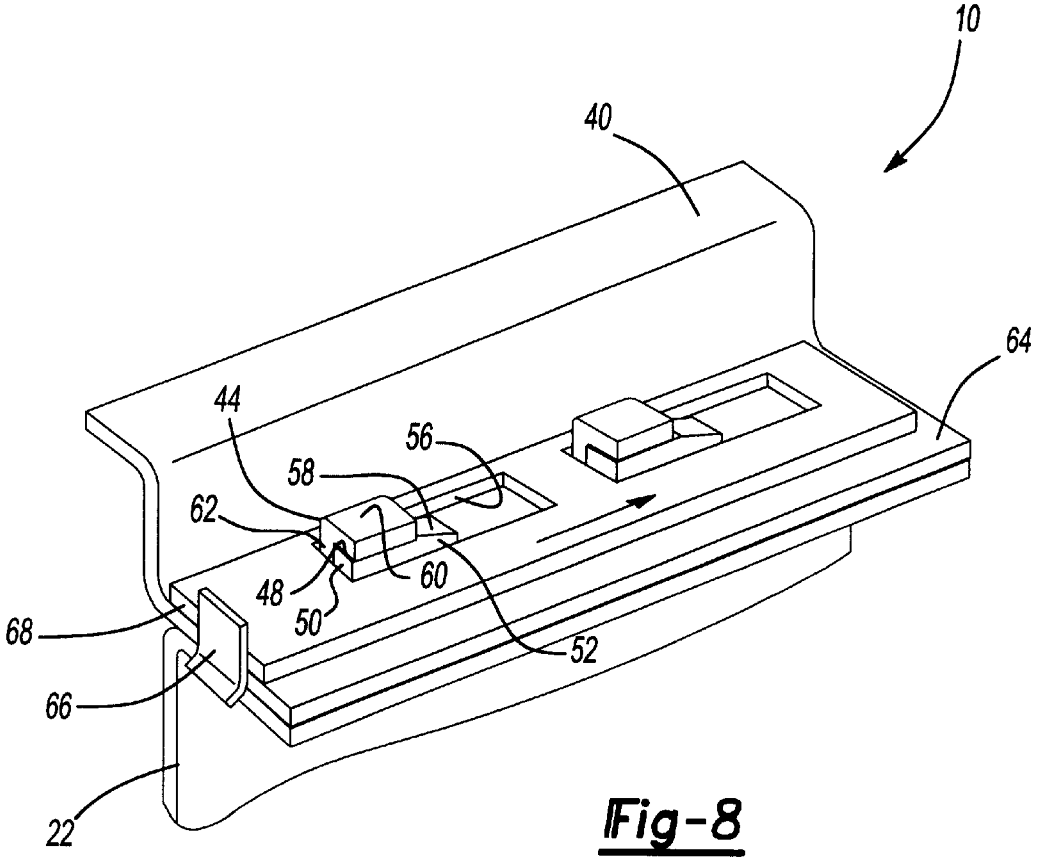
FIG. 8 illustrates the air cleaner cover in the locked position.

FIG. 8 illustrates the lock plate 46 after being slide into the locked position. As the lock plate 46 slides, the wedge 48 slides until it is positioned under and substantially contacts the upper portion 60 of the hook 44. The wedge 48 applies vertical pressure to the hook 44, puling the cover 40 and the box 22 together. The hook 44 does not hinder the movement of the lock plate 46 because the side portion 58 of the opening 54 slides around the attachment portion 62 of the hook 44 during sliding. The contact of the wedge 48 with the hook 44 secures the lock plate 46 in position, pulling both the cover 40 and the box 22 together. Additionally, the filter 17 is secured and sealed between the cover 40 and the box 22.

As further illustrated in FIG. 8, it is preferred that a flex end clip 66 be positioned on the end 68 of the lock plate 46. When the lock plate 46 is slid in the locked position of FIG. 8, the end clip 66 contacts the box 22 and the cover 40, preventing sliding of the lock plate 46 during operation. When the air cleaner 10 is to be serviced, the end clip 66 is pushed, disengaging the end clip 66 from the box 22 and the cover 40, and allowing the lock plate 46 to slide into the open position and be removed.

There are several advantages to utilizing an integrated resonator an air cleaner. For one, no separate tubing or exterior connections are needed. Additionally, as the resonator is positioned in the air cleaner 10 and is not visible, styling of the resonator volume box 10 is not required. Finally, the resonator volume can lock into position without the need of additional brackets or fasteners. There are also advantages to utilizing a lock plate 46 to secure the cover. The slide clip has simple retaining features which allow for easy servicing and security. Additionally, the clip area on the product is decreased, allowing for smaller installation space. The lock plate 46 can also be utilized with a hinge mechanism. Finally, bulky multi-part clips, springs, or screws are eliminated.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An air cleaner assembly comprising:

a box component including a slide retention structure;

a cover component;

a resonator slidingly engaging said slide retention structure of said box component;

an attachment system to secure said cover component to said box component, said attachment system including at least one aperture located on one of said components and at least one fastener located and positioned on the other of said components to insert within said at least one aperture when said cover component is positioned on said box component in a closed position; and a locking mechanism including at least one wedge, said at least one wedge pressed between said at least one aperture and said at least one fastener to secure said cover component to said box component when in said closed position.

2. The air cleaner assembly as recited in claim 1 wherein said slide retention structure engages a recess in said resonator.

3. The air cleaner assembly as recited in claim 1 wherein said resonator further includes a tube aperture and said box component further includes a tube which inserts within said tube aperture when said resonator is installed in said box component by sliding said resonator along said slide retention structure.

4. The air cleaner assembly as recited in claim 3 wherein said tube includes a plurality of openings to communicate an interior of said tube into a resonator chamber of said resonator.

5. The air cleaner assembly as recited in claim 3 wherein a seal is positioned in said tube aperture of said resonator to seal said tube to said resonator.

6. The air cleaner assembly as recited in claim 1 wherein said locking mechanism includes a fastener opening proximate to a front end of said at least one wedge substantially sized and shaped to receive said at least one fastener, and a side opening proximate to a side of said at least one wedge.

7. The air cleaner assembly as recited in claim 6 wherein said locking mechanism is positioned on said air cleaner assembly in said closed position so that said at least one fastener is positioned within said fastener opening of said locking mechanism and said locking mechanism is slid so that said at least one wedge substantially engages said at least one fastener in a locked position.

8. The air cleaner assembly as recited in claim 7 wherein said side opening of said locking mechanism passes around said at least one fastener while said locking mechanism slides to said locked position.

9. The air cleaner assembly as recited in claim 1 wherein said at least one wedge is substantially inclined upwardly from said front end of said at least one wedge.

10. An air cleaner assembly comprising:

a box component including a slide retention structure; and a resonator slidingly engaging said slide retention structure of said box component.

11. The air cleaner assembly as recited in claim 10 wherein said slide retention structure engages a recess in said resonator.

12. The air cleaner assembly as recited in claim 10 wherein said resonator further includes a tube aperture and said box component further includes a tube which inserts within said tube aperture when said resonator is installed in said box component by sliding said resonator along said slide retention structure.

13. The air cleaner assembly as recited in claim 12 wherein said tube includes a plurality of openings to communicate an interior of said tube into a resonator chamber of said resonator.

14. The air cleaner assembly as recited in claim 12 wherein a seal is positioned in said tube aperture of said resonator to seal said tube to said resonator.

15. The air cleaner assembly as recited in claim 12 wherein a seal is positioned in said aperture of said resonator to seal said tube to said resonator.

16. An air cleaner assembly comprising:

a box component;

a cover component;

an attachment system to secure said cover component to said box component, said attachment system including at least one aperture located on one of said components and at least one fastener located and positioned on the other of said components to insert within said at least one aperture when said cover component is positioned on said box component in a closed position; and a locking mechanism on a lock plate including aL least one wedge, sliding of said lock plate relative to said cover component and said box component presses said at least one wedge between said at least one aperture and said at least one fastener to secure said cover component to said box component when in said closed position.

17. The air cleaner assembly as recited in claim 16 wherein said at least one wedge is substantially inclined upwardly from said front end of said at least one wedge.

18. An air cleaner assembly comprising:

a box component;

a cover component;

an attachment system to secure said cover component to said box component, said attachment system including at least one aperture located on one of said components and at least one fastener located and positioned on the other of said components to insert within said at least one aperture when said cover component is positioned on said box component in a closed position; and a locking mechanism including at least one wedge, said at least one wedge pressed between said at least one aperture and said at least one fastener to secure said cover component to said box component when in said closed position, wherein said locking mechanism includes a fastener opening proximate to a front end of said at least one wedge substantially sized and shaped to receive said at least one fastener, and a side opening proximate to a side of said at least one wedge.

19. The air cleaner assembly as recited in claim 18 wherein said locking mechanism is positioned on said air cleaner assembly in said closed position so that said at least one fastener is positioned within said fastener opening of said locking mechanism and said locking mechanism is slid so that said at least one wedge substantially engages said at least one fastener in a locked position.

20. The air cleaner assembly as recited in claim 19 wherein said side opening of said locking mechanism passes around said at least one fastener while said locking mechanism slides to said locked position.

* * * * *